United States Patent [19]

Aymes

[11] Patent Number: 5,234,588

[45] Date of Patent: Aug. 10, 1993

[54] DEVICE FOR CLEANING SWIMMING POOL

[76] Inventor: Doniel G. Aymes, P.O. Box. 1783, New Brunswick, N.J. 08901

[21] Appl. No.: 948,127

[22] Filed: Sep. 21, 1992

[51] Int. Cl.$^5$ .............................................. E04H 3/16
[52] U.S. Cl. .................................... 210/202; 210/206
[58] Field of Search ............... 210/202, 206, 209, 169, 210/242.1

[56] References Cited

U.S. PATENT DOCUMENTS

| | | | |
|---|---|---|---|
| 3,426,901 | 2/1969 | Sherper | 210/169 |
| 3,607,103 | 9/1971 | Kiefer | 210/242.1 |
| 3,616,918 | 11/1971 | Simsbury et al. | 210/169 |
| 3,677,408 | 7/1972 | Dinizo, Jr. | 210/169 |
| 3,749,244 | 7/1973 | Jannuzzi, Jr. | 210/206 |
| 3,765,534 | 10/1973 | West et al. | 210/169 |
| 3,899,425 | 8/1975 | Lewis | 210/169 |
| 4,022,690 | 5/1977 | Smith | 210/169 |
| 4,181,702 | 1/1980 | Waston | 210/169 |
| 4,420,394 | 12/1983 | Lewis | 210/169 |
| 4,606,893 | 8/1986 | Sangster | 210/169 |
| 4,637,873 | 1/1987 | DeSousa et al. | 210/169 |
| 4,780,197 | 10/1988 | Schuman | 210/206 |
| 4,801,378 | 1/1989 | Desjoyaux et al. | 210/169 |
| 5,055,183 | 10/1991 | Buchan | 210/169 |
| 5,124,032 | 6/1992 | Newhard | 210/169 |

Primary Examiner—Stanley S. Silverman
Assistant Examiner—Cynthia L. Nessler
Attorney, Agent, or Firm—R. Neil Sudol; Henry D. Coleman

[57] ABSTRACT

A device for use in a system for cleaning a swimming pool includes a housing, a filter and a sterilizing component. The housing has an inlet port adapted to be connected to the sidewall of a swimming pool and an outlet port adapted to be connected to a suction pump, while the filter is disposed in the housing between between the inlet port and the outlet port for removing debris from a stream of pool water flowing from the inlet port through the housing to the outlet port during a cleaning operation. The sterilizing component is disposed in a predetermined location in the housing between the inlet port and the outlet port and in spaced relation with respect to the filter for dispensing a chemical sterilizing agent into the stream during the cleaning operation.

12 Claims, 2 Drawing Sheets

DEVICE FOR CLEANING SWIMMING POOL

BACKGROUND OF THE INVENTION

This invention relates to a device for cleaning a swimming pool. More particularly, this invention relates to a device for cleaning swimming pool water of particulate debris and for dispensing a chemical sterilizing agent into the water. This invention also relates to an associated method.

Generally, the water of swimming pools is sterilized during use by dispensing a chlorinating agent from a float which holds a chorinating tablet. The float is provided in a lower portion with a plurality of apertures which permit pool water to wash over and gradually dissolve the tablet. A disadvantage of such chlorinating floats is that children inevitably play with the float. The handling of the float by the children results in a concentrated amount of the chemical sterilizing substance being deposited on the children's hands.

Automatic chlorinators exist which are inserted downstream of a suction pump and a skimmer. Such automatic chorinators are pressurized and accordingly expensive to fabricate and inconvenient to use.

OBJECTS OF THE INVENTION

An object of the present invention is to provide a new method for sterilizing pool water.

Another, more particular, object of the present invention is to provide such a method which decreases the potential exposure of children to sterilizing chemicals.

A related object of the present invention is to provide an associated device for sterilizing pool water.

Yet another particular object of the present invention is to provide such a device which is simple to manufacture and easy to use.

These and other objects of the invention will be apparent from the descriptions and illustrations provided herein.

SUMMARY OF THE INVENTION

A device for use in a system for cleaning a swimming pool comprises, in accordance with a general conceptualization of the present invention, a housing, a filter and a sterilizing component. The housing has an inlet port adapted to be connected to the sidewall of a swimming pool and an outlet port adapted to be connected to a suction pump, while the filter is disposed in the housing between between the inlet port and the outlet port for removing debris from a stream of pool water flowing from the inlet port through the housing to the outlet port during a cleaning operation. The sterilizing component is disposed in a predetermined location in the housing between the inlet port and the outlet port and in spaced relation with respect to the filter for dispensing a chemical sterilizing agent into the stream during the cleaning operation.

A device for cleaning a swimming pool comprises, in accordance with a more specific conceptualization of the present invention, a housing having an inlet port adapted to be connected to the sidewall of a swimming pool and an outlet port adapted to be connected to a suction pump, a filter basket disposed in the housing between the inlet port and the outlet port, and a receptacle disposed in a predetermined location in the housing between the inlet port and the outlet port. The housing is provided with an opening communicating with the receptacle for enabling a user to deposit a dissolvable tablet of a sanitizing substance in the receptacle. The receptacle has a plurality of apertures, whereby a tablet deposited in the receptacle dissolves in a stream of pool water flowing from the inlet port through the housing to the outlet port.

Pursuant to further features of the present invention, the dispensing receptacle is disposed in the housing above the basket and the opening is in a substantially horizontally oriented upper wall of the housing. The upper wall of the housing may take the form of a lid removably attached to a sidewall of the housing. In addition, the receptacle may be attached to the lid. Preferably, the receptacle is removably suspended from an upper edge of the sidewall of the housing. This feature contemplates removal of the dispensing or chlorinating receptacle to enable cleaning of the filter basket.

Pursuant to a more particular feature of the present invention, the basket has a substantially horizontally oriented bottom panel and a generally vertically oriented peripheral wall, the receptacle having a bottom panel disposed above an upper rim of the peripheral wall.

Pursuant to another particular feature of the present invention, an adjustable closure is movably mounted to the receptacle for adjusting an effective size of the apertures, thereby varying flow rate of pool water through the receptacle and a rate of dispensing of sanitizing substance from the tablet into the pool water.

A method for cleaning a swimming pool comprises, in accordance with the present invention, the steps of (a) sucking water from the pool through a sidewall thereof, (b) filtering debris from the water sucked from the pool, (c) dispensing a chemical sterilizing agent into the water sucked from the pool, and (d) feeding the filtered water with the sterilizing agent to a pump and from the pump back to the pool.

According to another feature of the present invention, the dispensing of the sterilizing agent is implemented upstream of the step of filtering.

According to an additional feature of the present invention, the filtering of the pool water and the dispensing of the sterilizing or chlorinating agent therein are accomplished inside a skimmer housing. In that event, the method further comprises the step of depositing a tablet of the chemical sterilizing agent into a receptacle disposed in a predetermined location in the housing.

According to yet another feature of the present invention, the method further comprises the step of removing the receptacle from the housing and cleaning a filter basket disposed in the housing for implementing the step of filtering.

A method in accordance with the present invention for sterilizing pool water removes the chlorinating tablet from the pool and thereby reduces potential harm to children.

An in-line chlorinator and skimmer combination in accordance with the present invention is simple to manufacture and easy to use. The receptacle for the chlorinating tablet may be inserted into the upper part of a conventional automatic pool skimmer, which enables retrofitting of existing skimmers. The tablet of chlorinating compound may be simply dropped through an opening in the lid of the skimmer, whereupon the tablet falls into the dispensing receptacle and is held thereby in the stream of pool water. It is important that the dispensing receptacle is held above the filter basket to enable free flow of water and capture of debris and large particles by the basket.

DETAILED DESCRIPTION

Figure 1:
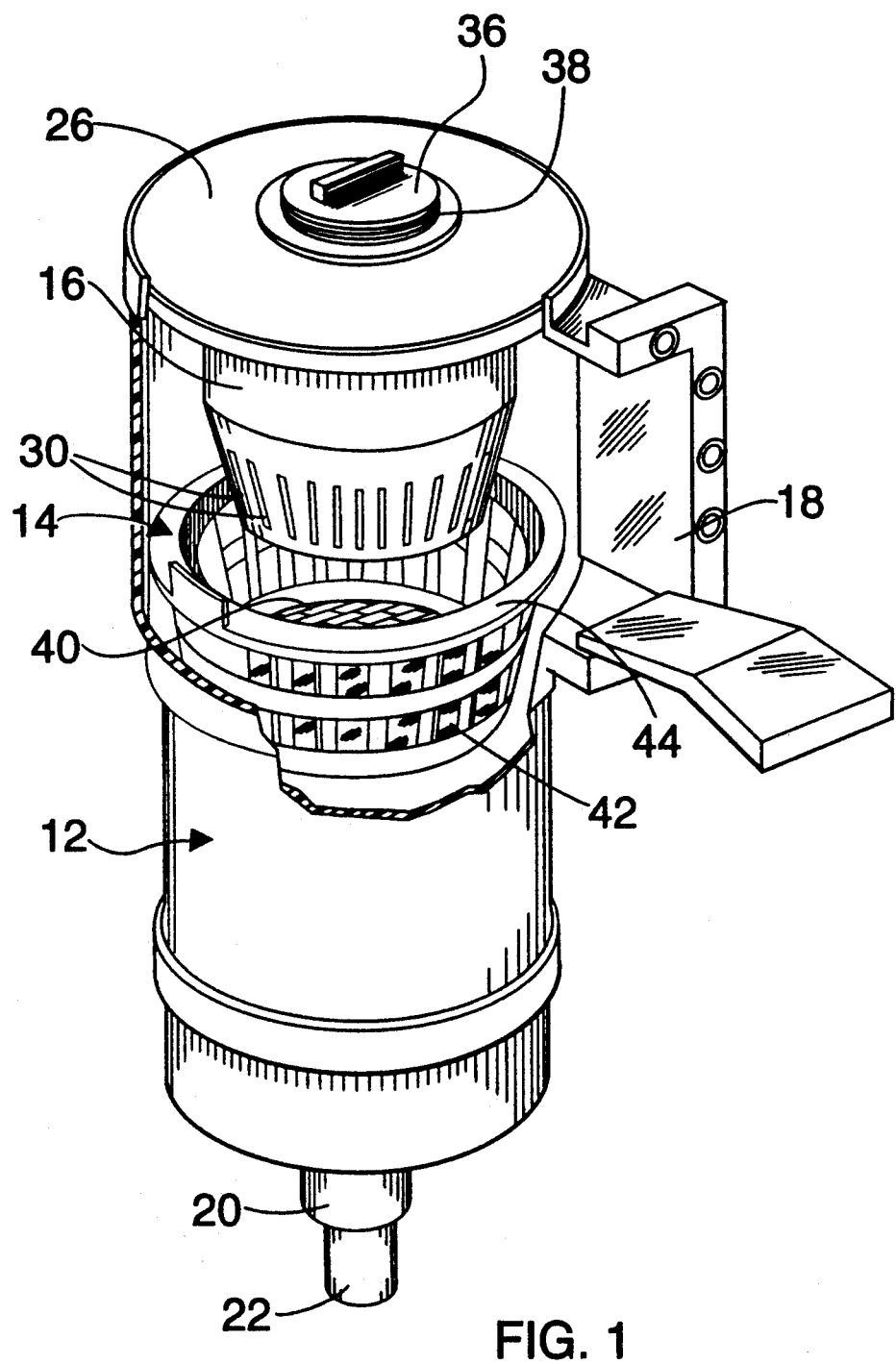
FIG. 1 is an isometric or perspective view of a swimming pool skimmer with an in-line chlorinator, in accordance with the present invention.
Figure 2:
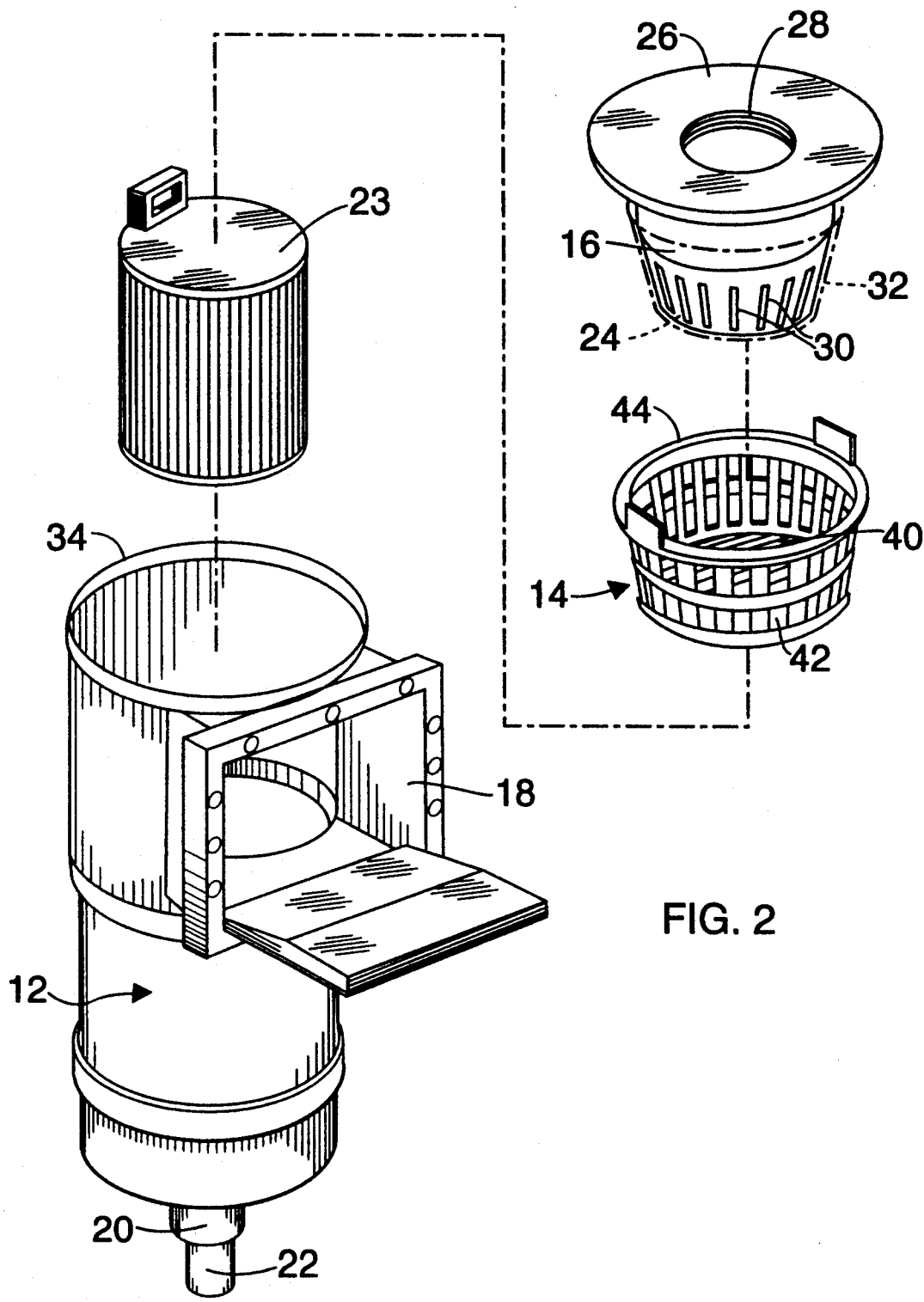
FIG. 2 is an exploded perspective view of the skimmer/chlorinator of FIG. 1.

As illustrated in FIGS. 1 and 2, a combination skimmer and in-line chlorinator device or assembly for cleaning an above-ground or in-ground swimming pool comprises a skimmer housing 12, a filter or strainer basket 14 and a sterilization receptacle 16 for holding a chlorinating tablet (not shown) to dispense a sterilizing chemical during a flow of pool water through the skimmer housing 12.

Housing 12 has an inlet port 18 adapted to be connected to the sidewall of a swimming pool (not illustrated) and an outlet port 20 adapted to be connected to a suction pump (not shown) via a hose 22. Strainer basket 14 is disposed in housing 12 between between inlet port 18 and outlet port 20 for removing debris such as bits of leaves from a stream of pool water flowing from inlet port 18 through housing 12 to outlet port 20 during a cleaning operation. A particulate filter 23 is disposed in housing 12 between a lower side of strainer basket 14 and outlet port 20.

Sterilization receptacle 16 is disposed in a predetermined location in housing 12 between inlet port 18 and outlet port 20 and in spaced relation with respect to strainer basket 14 for dispensing a chemical sterilizing agent in the form of a conventional chlorine compound into the stream during the cleaning operation. More particularly, sterilization receptacle 16 is supported above strainer basket 14 in housing 12 so that a bottom panel 24 of receptacle 16 is spaced from basket 14 by a distance sufficient to avoid interfering with the collection of debris by the strainer basket, as illustrated in FIG. 1.

As illustrated in FIG. 2, receptacle 16 may be integrally attached to a lid or cover panel 26 of housing 12 so that receptacle 16 is suspended above strainer basket 14 upon a closure of housing 12 by lid or cover panel 26. Lid 26 is provided with an opening 28 communicating with receptacle 16 for enabling a user to deposit a dissolvable tablet of a chlorinating substance in the receptacle.

Receptacle 16 has a plurality of circumferentially equispaced elongate apertures or slits 30, whereby a tablet deposited in receptacle 16 dissolves in a stream of pool water flowing from inlet port 18 through housing 12 to outlet port 20. Receptacle 16 may be provided with an optional cup-shaped closure element 32 rotatably mounted to the receptacle along a lower portion thereof for adjusting an effective size of apertures 30, thereby varying flow rate of pool water through receptacle 16 and concomitantly modifying the dispersion rate of the chlorinating tablet. Closure element 32 is provided with elongate apertures or slits (not illustrated) larger than apertures 30. When the slits of closure elements 32 are aligned with respective apertures 30 of receptacle 16, the flow rate through receptacle 16 is maximized. As closure element 32 is rotated to partially cover apertures 30, the flow rate and consequently the chlorinating rate are reduced.

It is to be noted that receptacle 16 and lid 26 may be separable components. Receptacle 16 may be provided with a plurality of radially extending fingers (not shown) or an annular flange (not shown) serving to engage an upper rim 34 (FIG. 2) of housing 12 and to suspend receptacle 16 from the upper housing rim. As illustrated in FIG. 1, lid 26 is optionally provided with a plug or cap 36 having an external screw thread 38 for removably screwing the plug into opening 28.

As illustrated in the exploded view of FIG. 2, lid 26, receptacle 16, strainer basket 14, and filter 23 may be removed in that order from housing 12 to enable cleaning of the various components or substitution of new components.

Basket 14 has a substantially horizontally oriented bottom panel 40 and a generally vertically oriented peripheral wall 42. Bottom panel 24 of receptacle 16 is disposed above an upper rim 44 of peripheral wall 42.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are preferred by way of example to facilitate comprehension of the invention and should not be construed to limit the scope thereof.

What is claimed is:

1. A device for cleaning a swimming pool, comprising:
 a housing having an inlet port connectable to a sidewall of a swimming pool and an outlet port connectable to a suction pump;
 a filter basket disposed in said housing between said inlet port and said outlet port; and
 a receptacle mounted to said housing in a predetermined location between said inlet port and said outlet port, said housing being provided with an opening communicating with said receptacle for enabling a user to deposit a sanitizing tablet in said receptacle, said receptacle having a plurality of apertures and being disposed in a fluid flow path extending through said housing from said inlet port directly to said outlet port so that a tablet deposited in said receptacle dissolves in a stream of pool water flowing from said inlet port through said housing to said outlet port, said receptacle being disposed above said basket, said receptacle being spaced from said basket, thereby avoiding interference with a collection of debris by said basket.

2. The device defined in claim 1, further comprising adjustable closure means movably mounted to said receptacle for adjusting an effective size of said apertures, thereby varying flow rate of pool water through said receptacle and a rate of dispensing of sanitizing substance from said tablet into the pool water.

3. The device defined in claim 1 wherein said receptacle is removably suspended from an upper edge of the sidewall of said housing.

4. The device defined in claim 1 wherein said basket has a substantially horizontally oriented bottom panel and a generally vertically oriented peripheral wall, said receptacle having a bottom panel disposed above an upper rim of said peripheral wall.

5. The device defined in claim 1 wherein said opening is in a substantially horizontally oriented upper wall of said housing.

6. The device defined in claim 5 wherein said upper wall of said housing is a lid removably attached to a sidewall of said housing.

7. The device defined in claim 6 wherein said receptacle is attached to said lid.

8. A device for use in a system for cleaning a swimming pool, comprising:
   a housing having an inlet port connectable to a sidewall of a swimming pool and an outlet port connectable to a suction pump;
   filter means disposed in said housing between between said inlet port and said outlet port for removing debris from a stream of pool water flowing from said inlet port through said housing to said outlet port during a cleaning operation; and
   sterilizing means for dispensing a chemical sterilizing agent into said stream during said cleaning operation, said sterilizing means being mounted to said housing in a predetermined location above said filter means and in a fluid flow path extending directly between said inlet port and said outlet port, said sterilizing means being disposed in spaced relation with respect to said filter means to avoid interference with a collection of debris by said filter means.

9. The device defined in claim 8 wherein said sterilizing means includes a receptacle disposed in said predetermined location in said housing, said receptacle having a plurality of apertures, whereby a tablet deposited in said receptacle dissolves in said stream.

10. The device defined in claim 9 wherein said housing is provided with an opening communicating with said receptacle for enabling a user to deposit a sanitizing tablet in said receptacle.

11. The device defined in claim 10 wherein said opening is disposed in a generally horizontally oriented upper panel of said housing.

12. The device defined in claim 11 wherein said receptacle is connected to said upper panel and is removable therewith.

* * * * *